US 8,583,806 B2
Nov. 12, 2013

(12) United States Patent
Fleischman et al.

(54) DATA SHARING METHOD FOR RECURSIVE DNS SERVERS

(71) Applicant: Xerocole, Inc., Clifton Park, NY (US)

(72) Inventors: Robert M. Fleischman, Concord, NH (US); William Thomas Waters, Clifton Park, NY (US); Robert Alton Wyatt, Windham, NH (US)

(73) Assignee: Xerocole, Inc., Clifton Park, NY (US)

( * ) Notice: Subject to any disclaimer, the term of this patent is extended or adjusted under 35 U.S.C. 154(b) by 0 days.

(21) Appl. No.: 13/759,191

(22) Filed: Feb. 5, 2013

(65) Prior Publication Data

US 2013/0204978 A1    Aug. 8, 2013

Related U.S. Application Data

(60) Provisional application No. 61/595,433, filed on Feb. 6, 2012.

(51) Int. Cl.
*G06F 15/16* (2006.01)

(52) U.S. Cl.
USPC .......................................... 709/227; 709/219

(58) Field of Classification Search
USPC ......... 709/227, 220–222, 223–226, 238, 239, 709/245, 217–219
See application file for complete search history.

(56) References Cited

U.S. PATENT DOCUMENTS

| | | | |
|---|---|---|---|
| 2003/0154306 A1* | 8/2003 | Perry ........................... | 709/245 |
| 2007/0041393 A1 | 2/2007 | Westhead et al. | |
| 2007/0118668 A1* | 5/2007 | McCarthy et al. ............ | 709/238 |
| 2007/0294427 A1 | 12/2007 | Retkin et al. | |
| 2008/0028463 A1 | 1/2008 | Dagon et al. | |
| 2008/0086574 A1 | 4/2008 | Raciborski et al. | |
| 2008/0288470 A1 | 11/2008 | Goutard et al. | |
| 2010/0199122 A1 | 8/2010 | Sood | |
| 2010/0257258 A1 | 10/2010 | Liu et al. | |
| 2010/0274970 A1 | 10/2010 | Treuhaft et al. | |
| 2010/0332680 A1 | 12/2010 | Anderson et al. | |
| 2011/0087769 A1* | 4/2011 | Holmes et al. ................ | 709/224 |
| 2011/0208876 A1 | 8/2011 | Marshall et al. | |
| 2011/0302322 A1 | 12/2011 | Raciborski et al. | |
| 2012/0036161 A1 | 2/2012 | Aston et al. | |
| 2012/0215912 A1 | 8/2012 | Holden et al. | |
| 2012/0254996 A1* | 10/2012 | Wilbourn et al. ............... | 726/22 |
| 2012/0324113 A1 | 12/2012 | Prince et al. | |
| 2013/0086263 A1 | 4/2013 | Prasad et al. | |

OTHER PUBLICATIONS

Arkko, et al. WO2012/065641 A1, May 2012, WIPO.*
Qian et al., "Bring Local DNS Servers Close to Their Clients," Dec. 2011, IEEE Globecom 2011 proceedings.*

(Continued)

*Primary Examiner* — Ruolei Zong
(74) *Attorney, Agent, or Firm* — Neugeboren O'Dowd PC

(57) ABSTRACT

This disclosure describes systems, methods, and apparatus for sharing DNS answers between DNS server systems within a DNS cluster, between proxy servers, and/or between DNS server systems of different DNS clusters. When a DNS answer is obtained by a DNS server system, the answer can be shared with peer DNS server systems within a same DNS cluster or with DNS server systems having a logical relation to the first DNS server system (e.g., geographic relationship), but being in different DNS clusters. Proxy servers may also mediate communication between a client and the DNS clusters. These proxies can also include the ability to share DNS answers between each other.

25 Claims, 8 Drawing Sheets

(56) References Cited

OTHER PUBLICATIONS

Donaghue, Larry D., "Office Action re U.S. Appl. No. 13/756,642", Jun. 4, 2013, p. 19 Published in: US.

Young, Lee W., "International Search Report and Written Opinion re Application No. PCT/US13/24163", May 20, 2013, p. 9 Published in: WO.

Young, Lee W., "International Search Report and Written Opinion re Application No. PCT/US2013/24693", May 23, 2013, p. 9 Published in: US.

Gruber, Stephen S., "Response to Office Action re U.S. Appl. No. 13/756,642", Jun. 17, 2013, p. 9 Published in: US.

* cited by examiner

DATA SHARING METHOD FOR RECURSIVE DNS SERVERS

PRIORITY AND RELATED APPLICATIONS

The present Application for Patent claims priority to Provisional Application No. 61/595,433 entitled "DATA SHARING METHOD FOR RECURSIVE DNS SERVERS" filed Feb. 6, 2012, and assigned to the assignee hereof and hereby expressly incorporated by reference herein.

FIELD OF THE DISCLOSURE

The present disclosure relates generally to domain name server (DNS) activities. In particular, but not by way of limitation, the present disclosure relates to systems, methods and apparatuses for answering DNS queries.

BACKGROUND

To connect an Internet user's computer to a server hosting a webpage, a web server, an Internet Protocol (IP) address of the web server is typically required. Yet, users and web browsers typically only have access to a domain name such as "abc.example.com". To access the webpage, a web browser submits a domain name system (DNS) query to the DNS. A DNS query typically includes a domain name and the DNS either returns an IP address of the server hosting the URL or an error.

The DNS includes authoritative DNS servers that are servers responsible for translating domain names into IP addresses. Authoritative DNS servers can also be arranged in hierarchies where each level of authoritative DNS server is responsible for a level of the domain. For a given level, there are also master and slave authoritative servers and clusters of authoritative DNS servers that each maintain synched records of domain names and IP addresses. By distributing DNS records over multiple servers, loads on an authoritative DNS server can be reduced.

Yet, DNS queries would still place insurmountable loads on authoritative DNS servers, so caching on alternative servers is used to reduce the number of queries that reach authoritative DNS servers. These alternative servers are called recursive DNS servers, name servers, DNS cache servers, caching name servers, or DNS caches (hereinafter "DNS cache servers"). DNS cache servers store domain names and mappings to the associated IP addresses for some of the more commonly-requested web pages. DNS queries are directed to DNS cache servers in the hope that a DNS cache server will be able to answer the query based on an IP address in its local cache. Only where an answer has not been cached in the DNS cache server handling a query is the DNS query forwarded to one or more authoritative DNS servers.

Whether the DNS answer (e.g., an IP address of the requested web page) is obtained from a DNS cache server or from an authoritative DNS server, the DNS answer is then returned to the client that made the DNS query allowing the client to connect to the web server hosting the desired web page.

A DNS answer can include one or more data records each with a time-to-live (TTL) value that indicates how long the data is valid (not-expired). For instance, where an authoritative DNS server wants to ensure that an IP address for a web server is updated frequently, the authoritative DNS server may set a lower TTL value. A DNS answer can be cached and used to answer subsequent DNS queries as long as the TTL has yet to expire. In other words, while the TTL is ticking down, the recursive DNS need not query the authoritative DNS server to answer the same DNS query. However, when a DNS answer's TTL expires, the recursive DNS server typically makes queries to authoritative DNS servers to obtain a fresh copy of the data to use in DNS answers.

Sometimes the recursive DNS server is temporarily unable to update a previously valid, but, expired DNS answer in its cache. This frequently occurs when network connectivity is interrupted, so the authoritative DNS server cannot be reached, the authoritative DNS server returns an empty answer, or the authoritative DNS server returns an error. If a client requests an answer during this period, then the recursive DNS server will present the client with an error or empty message.

Client queries are often distributed between one of multiple "peer DNS servers" (e.g., recursive DNS servers) in a DNS server cluster. Load-balancing is a method of distributing client queries amongst peer DNS servers so as to optimally utilize their parallel capabilities rather than overloading one or a few DNS servers. Peer DNS servers may be equally-capable of handling a query. On the other hand, some members of the cluster may be better-suited to handle a particular query than other members, and in these cases queries can be directed to the DNS server in the cluster best-able to handle the query. Other logical considerations can also come into play when determining which DNS server in a cluster handles a given query.

One problem with load-balancing is that peer DNS servers sometimes return different answers to the same query. This can be caused by the fact that each DNS server may have different versions of an answer either because they previously made the same query at different times or because they made the query to different authoritative DNS servers. Thus, answers are not always consistent within a cluster.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as a method for responding to a client DNS query including receiving a DNS query from a client at a first DNS server system. The method can further include obtaining a DNS answer to the DNS query. The method can yet further include determining if the DNS answer should be shared with a second DNS server system. The method can further include sharing the DNS answer with the second DNS server system. Lastly, the method can include returning the DNS answer to the client.

Other embodiments of the disclosure may also be characterized as a DNS server cluster comprising a first peer DNS server system, and a second peer DNS server system. The second peer DNS server system can receive a DNS query from a client and check a local cache of the second peer DNS server system for a DNS answer to the DNS query. Upon not finding the DNS answer, the second peer DNS server system can pass the DNS query to at least one remote DNS server system and receive the DNS answer from the remote DNS server system. The second peer DNS server system can then pass the DNS answer to the client in response to the DNS query and share the DNS answer with the first peer DNS server system.

Other embodiments of the disclosure may also be characterized as a sharing module of a first DNS server system, the sharing module having a query processing module and a transmission module. The query processing module receives a first DNS query for a first DNS answer from a client and passes the first DNS query to a remote DNS server system. The query processing module receives the first DNS answer from the remote DNS server system and returns the first DNS answer to the first client in response to the first DNS query. The transmission module shares the first DNS answer with at least a second DNS server system.

Yet further embodiments of the disclosure may also be characterized as a sharing module of a first proxy server comprising a query processing module and a transmission module. The query processing module can receive a first DNS query for a first DNS answer from a first client. The query processing module can direct the first DNS query to a first of a plurality of DNS server systems in a DNS cluster. The query processing module can further receive the first DNS answer from the first of the plurality of DNS server systems. The query processing module can also return the first DNS answer to the first client in response to the first DNS query. The transmission module can share the first DNS answer with at least a second proxy server.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The word "exemplary" is used herein to mean "serving as an example, instance, or illustration." Any embodiment described herein as "exemplary" is not necessarily to be construed as preferred or advantageous over other embodiments.

The present disclosure describes systems, methods, and apparatus for sharing answers between peer DNS servers so as to allow faster query responses and increased consistency of answers within a cluster. By sharing answers, DNS servers in the cluster can sometimes avoid querying remote servers to obtain an answer that another DNS server has already obtained. This avoids duplicitous queries within the cluster as long as a shared answer is still valid (e.g., has not expired or does not have an expired TTL). Sharing also improves the likelihood that two DNS servers will return the same answer to identical or similar client queries, thus improving consistency.

Some advantages of the systems, methods, and apparatus herein disclosed are advantageous synchronizing of data from multiple DNS servers, reducing the total amount of work performed by a cluster of peer DNS servers, and reducing the response time that clients experience when using the DNS. In other words, the work of a single DNS server in finding an answer to a query can be leveraged, via sharing, to the benefit of a plurality of DNS servers within a cluster.

For the purposes of this disclosure, a cluster or cluster of peer DNS servers includes those DNS servers that attempt to provide identical answers to identical clients. Peer servers tend to be in a same geographic area, although this is not required. In one embodiment, peer DNS servers are all those participating in the same load-balancing operation (e.g., behind a load-balancing computing system). Peer DNS servers can also be configured to be failovers, backups, or equivalents to other peers in a cluster. A DNS server can include all servers configured to answer recursive DNS queries. Servers in a cluster can communicate with each other via direct wired communication connections, yet this communication can be governed by the Internet Protocol. In other instances, other network types including the Internet can separate servers within a cluster.

Figure 1:
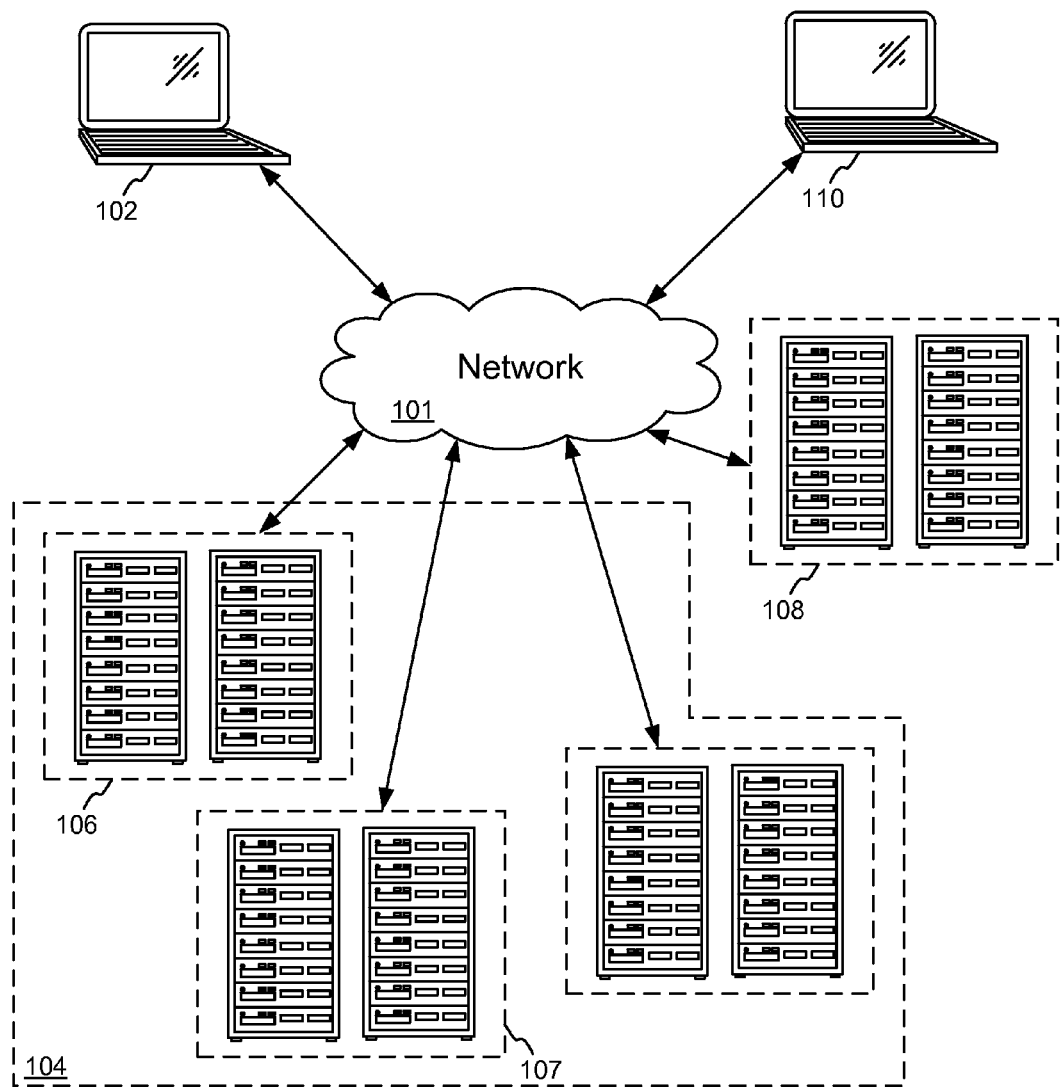
FIG. 1 illustrates an embodiment of a system for sharing DNS answers between peer DNS servers in a DNS cluster.

FIG. 1 illustrates an embodiment of a system for sharing DNS answers between peer DNS servers in a DNS cluster. The system includes a first client 102 serviced by a group or cluster of peer DNS server systems 104. When the first client 102 makes a query for an answer (e.g., an IP address associated with a URL or domain name) the query is typically processed by one of the peer DNS server systems in the cluster 104. For instance, a first peer DNS server system 106 can determine an answer to the query either by accessing an answer stored in a local cache of the first peer DNS server system 106 or via querying one of the other peer DNS servers, or by querying a remote DNS server system 108 (e.g., an authoritative DNS server system and optionally one or more servers responsible for being authoritative of sub-domains for the authoritative DNS server system). If the answer is found in another server system, then the first peer DNS server system 106 can return the answer to the first client 102 and store the answer in its local cache for reuse.

The first peer DNS server system 106 can also share the answer stored in its local cache with other peer DNS servers in the cluster 104. A second client 110 may also be serviced by the cluster of peer DNS server systems 104, and the second client 110 may make the same query to the cluster 104 as did the first client 102. Because of load-balancing, the query may be processed by the first peer DNS server 106 or by any of the other peer DNS servers in the cluster 104. Traditionally, if a second peer DNS server 107 responded to the query, it would either have to find the answer in its own cache or perform a query to a peer or a remote DNS server such as remote DNS server 108. However, in this disclosure, the first peer DNS server 106 can share its answer with the second peer DNS server 107 and any other peers in the cluster 104. In this way, if a second query is made by the second client 110 and is answered by the second peer DNS server 107, the second peer DNS server 107 has the answer in cache and does not have to query another peer or the remote DNS server 108.

As a result, less querying need take place to answer queries made to the cluster 104 of peer DNS servers, less power is consumed responding to queries, and answers from different peers in the cluster 104 are more likely to be consistent.

Figure 7:
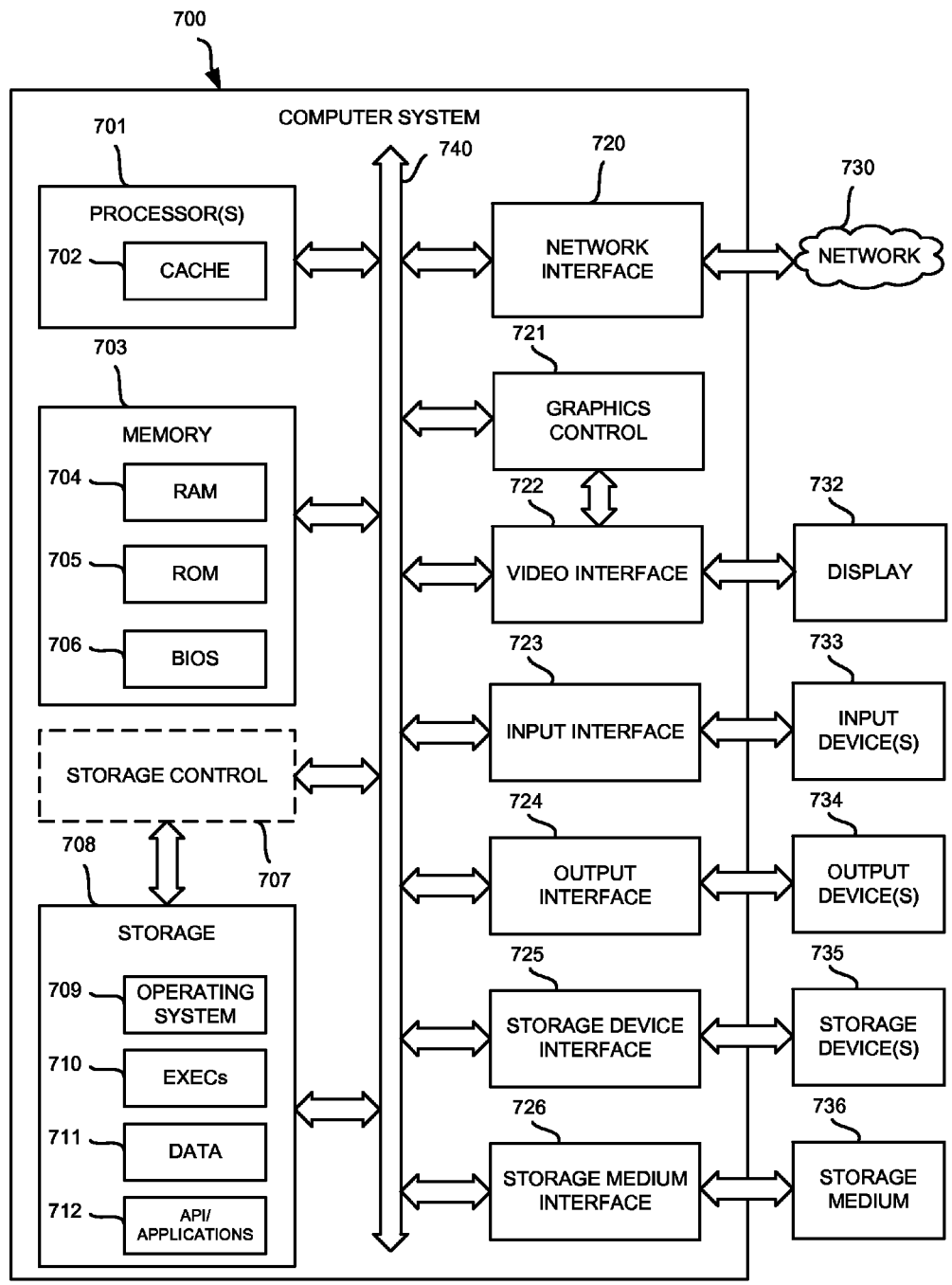
FIG. 7 shows a diagrammatic representation of one embodiment of a machine in the exemplary form of a computer system.

One of skill in the art will recognize that the cluster of DNS servers 104 and the remote server system 108 can comprise a single server or a distributed cluster of servers at one or more locations. The functions of the cluster of DNS servers 104 and the remote server system 108 can also be distributed among one or more servers. Additionally, although the clients 102, 110 are illustrated as laptops, these illustrations represent any computing system with a network 101 connection. For instance, tablet computers, smartphones, desktop computers, ultrabooks, and netbooks, are a few examples. The answer can include an IP address associated with the domain name or hostname of the query or mail exchange records, to name two examples. This answer can be used to connect either client 102, 110 with a target computer (not illustrated) such as a web server hosting a webpage that either client 102, 110 is trying to view. The answer may also be augmented with additional information such as state information (e.g., performance and responsiveness of other peer DNS servers in the cluster 104). Finally, while the answer can be shared among peer DNS servers in the cluster 104, it can also be shared among a wider range of servers. For instance, and as illustrated in FIG. 7, answers can be shared between DNS server systems that are part of different clusters.

Answers can be shared in whole or in part. For instance, a subset of all data in an answer may be shared. Some factors that can be considered when determining whether to share a DNS answer include the following: popularity; remaining TTL; resources required to obtain the DNS answer. Some factors that can be considered when determining whether to store a shared DNS answer include the following: how busy is the receiving DNS server system; remaining TTL (e.g., where the receiving DNS server system has different standards relative to an acceptable remaining TTL than does the DNS server system sharing the answer); and remaining space on local cache.

A variety of protocols are used to send and receive answers between peer DNS server systems within the DNS cluster 104, including, but not limited to, Unicast UDP, Multicast UDP, Broadcast UDP, and TCP.

Answers can include a variety of data such as an IP address of a web domain or hostname. They can also be augmented by additional information such as state information. State information can describe the remote server system 108. For instance, an answer may include state information describing servers within the remote server system 108 and describing their performance and responsiveness. State information may also describe a state of other servers in the cluster 104. State information in an answer may indicate which peer servers are online or which ones are heavily-loaded or running slower than an acceptable limit. In this way, queries can avoid the inaccessible or slow peer server(s) or less often query to the inaccessible or slow peer server(s). State information may also include a size of the answer in terms of units of memory—larger answers, those taking up more memory, may be more likely to be shared.

State information may also include a time that was used to obtain an answer or a value representing the processing resources used to obtain the answer. This state information can be used to determine which answers should be shared. Those answers requiring the longest time or the most resources to obtain are more likely to be shared. State information may also describe a popularity of the answer—more interesting or popular answers are more likely to be shared. State information in an answer may also include an error message or some other data indicating that communication with the remote server system 108 is not possible.

A "server system" can include one or more servers. The remote server system 108 can include one or more related or unrelated servers. For instance, the remote server system 108 can include the following unrelated DNS servers: a VERIZON DNS server and a COMCAST DNS server. Yet, in another example, the remote server system 108 can include a single DNS server for STARBUCKS.

Figure 2A:
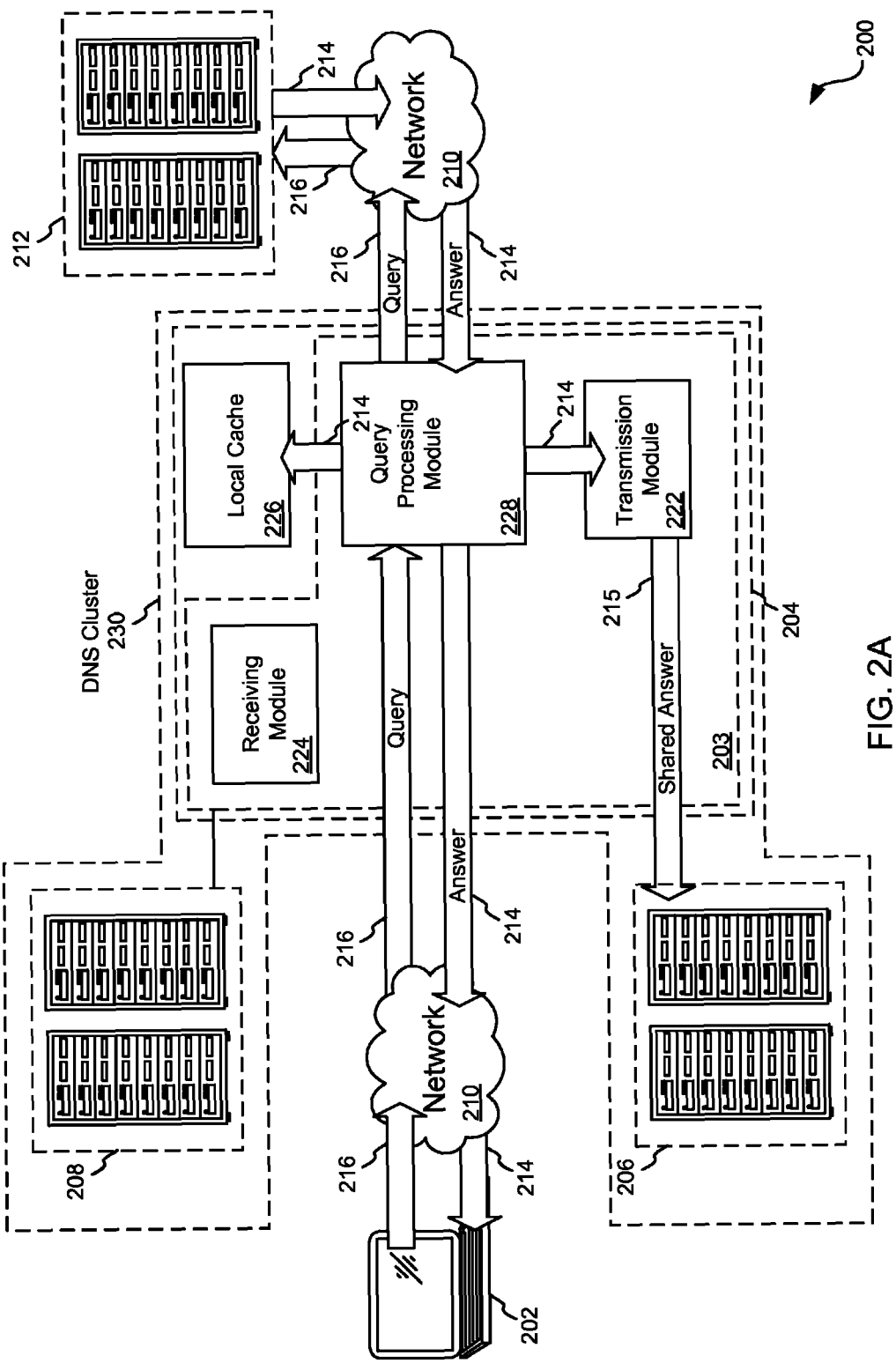
FIG. 2A illustrates another embodiment of a system for sharing DNS answers between peer DNS servers in a DNS cluster.
Figure 2B:
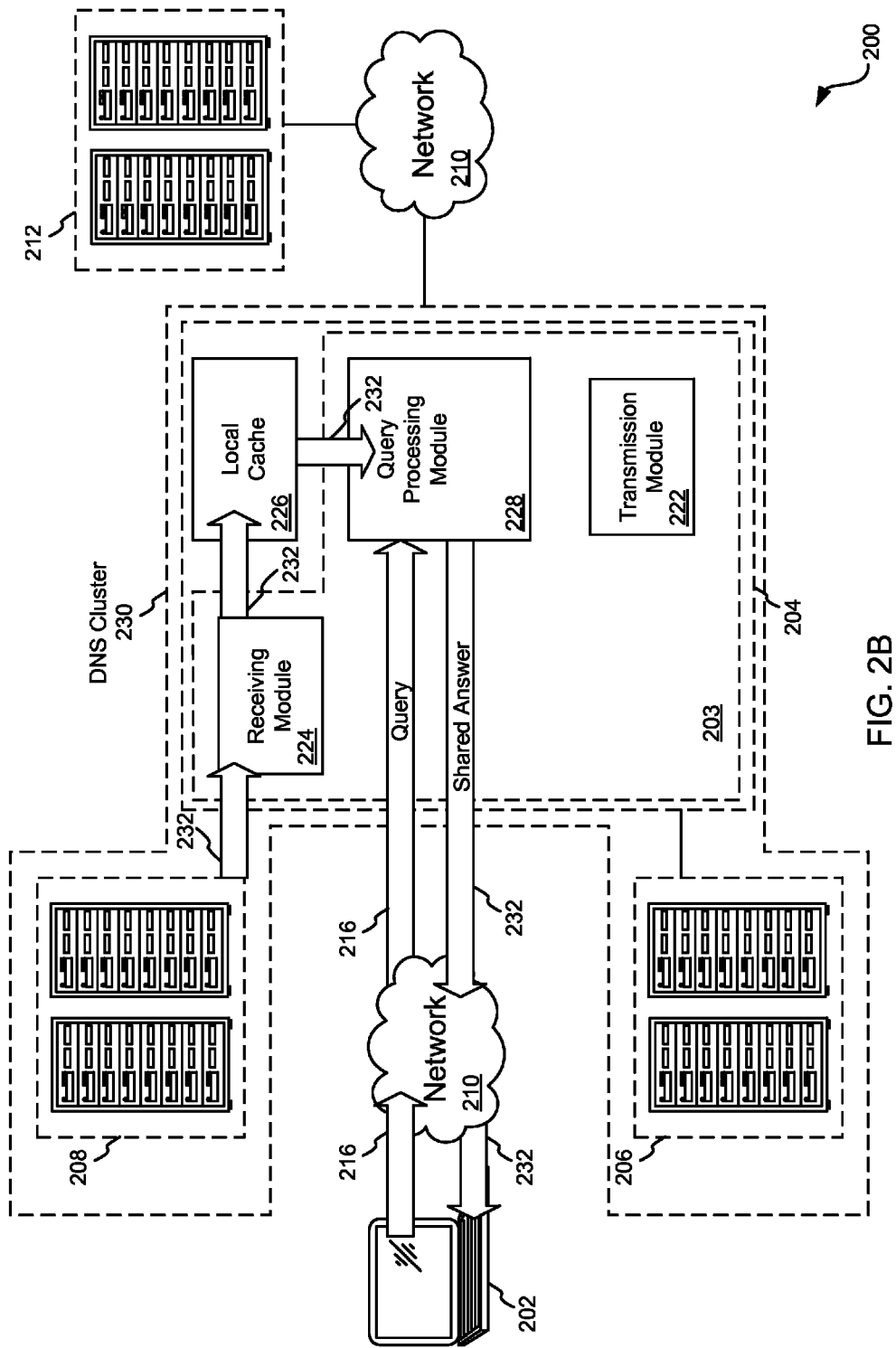
FIG. 2B illustrates another embodiment of a system for sharing DNS answers between peer DNS servers in a DNS cluster.

FIGS. 2A and 2B illustrate a system for sharing answers to DNS queries between peer DNS servers. A client or server 202 can make a query 216 that is directed to a first peer DNS server system 204 of a DNS cluster 230. The first peer DNS server system 204 can include a local cache 226. If an answer 214 to the query 216 is in the local cache 226, then the first peer DNS server system 204 can access the answer 214 from the local cache 226 and return it to the client or server 202. If the answer 214 is not in the local cache 226 (as illustrated in FIG. 2A), then the first peer DNS server system 204 can query a remote DNS server system 212, such as an authoritative DNS server, via a network 210 (e.g., a network including the Internet). The first peer DNS server system 204 can receive an answer 214 from the remote DNS server system 212 via the network 210. The first peer DNS server system 204 can then provide the answer 214 to the client or server 202 and store the answer 214 in the local cache 226. The answer 214 can be reused to answer additional queries until a TTL of the answer 214 expires.

Given the time and processing resources required to obtain the answer 214, other DNS servers could benefit from having this answer 214 in preparation for responding to a similar query. In the illustrated embodiment, the answer 214 can be shared with any peer DNS server—those servers that are part of the DNS cluster 230. For clarity, the answer 214 can be referred to as a shared answer 215 when it is shared with peer DNS server systems (even if the shared answer 215 is identical to the answer 214). In other embodiments, the shared answer 215 can be shared outside the DNS cluster 230.

Similarly, the first peer DNS server system 204 may benefit from answers that other peer DNS server systems in the DNS cluster 230 have obtained. The first peer DNS server system 204 is therefore also configured to receive shared answers from other DNS server systems in the DNS cluster 230. For instance, in FIG. 2B, the first peer DNS server system 204 receives a shared answer 232 from a third peer DNS server system 208. In other embodiments, the first peer DNS server system 204 is configured to receive shared answers from other DNS server systems including those outside of the DNS cluster 230.

One of skill in the art will recognize that the first, second, and third peer DNS server systems 204, 206, 208 are exemplary and their order and functions are interchangeable. For instance, the second peer DNS server system 206 can provide shared answers to the first and third peer DNS sever systems 204, 208.

Further details regarding subcomponents and modules of the first peer DNS server system 204 will now be discussed. The first peer DNS server system 204 can include a sharing module 203, which can include a query processing module 228, a transmission module 222, and a receiving module 224. The first peer DNS server system 204 can further include a local cache 226 that is accessed and utilized by the sharing module 203. Other peer DNS server systems (e.g., 206, 208) can also include a local cache and/or sharing module. The subcomponents and modules used to transmit a shared answer 215 to a peer are discussed relative to FIG. 2A, and the subcomponents and modules used to receive a shared answer 214 from a peer are discussed relative to FIG. 2B.

When sharing (FIG. 2A), the first peer DNS server system 204 can obtain an answer 214 from the remote DNS server system 212 via the query processing module 228 in response to the query 216 from the client or server 202. When the answer 214 is received by the first peer DNS server system 204, the query processing module 228 can evaluate the answer 214 and attributes of the first peer DNS server system 204 to determine whether or not to share the answer 214 with peers. If the answer 214 is to be shared, then the query processing module 228 instructs the transmission module 222 to pass the shared answer 215 to another peer DNS server system such as the second peer DNS server system 206. The second peer DNS server system 206 can then use the shared answer 215 when queried with the same or a similar query to provide an answer without having to query a remote server. Whether the answer 214 is shared or not, the query processing module 228 also passes the answer 214 back to the client or server 202 in response to the initial query, and the stores the answer 214 in the local cache 226.

The attributes that the query processing module 228 can consider when determining whether to share the answer 214 or not, include, but are not limited to, TTL, popularity for a particular answer 214 (e.g., how often the DNS cluster 230 responds to a query with the particular answer), and the amount of time or processing resources that will be used to process the query 216.

When receiving a shared answer 232 from a peer (FIG. 2B), the receiving module 224 of the sharing module 203 receives the shared answer 232 from a peer, such as the third peer DNS server system 208. The receiving module 224 can determine whether or not the shared answer 232 is appropriate for storing in the local cache 226 (e.g., answers to popular queries are more likely to be stored; e.g., answers having a nearly-expired TTL are less likely to be stored). If so, then the shared answer 232 is cached in local cache 226. When a query 234 is received from the client or server 202, the query processing module 228 can look to the local cache 226 for an answer. If the shared answer 232 is in the local cache 226, then the query processing module 228 can return the shared answer 232 to the client or server 202. If the answer has not been shared with the first peer DNS server system 204, or if it was, but the shared answer 232 was not stored in the local cache 226, then the first peer DNS server system 204 can query the remote DNS server system 212 for the answer as in FIG. 2A.

The attributes that the receiving module 224 can consider when determining whether to cache the shared answer 232 or not include, but are not limited to TTL, whether the shared answer 232 is already cached in the local cache 226, local cache 226 size, a load on the first peer DNS server system 204, and the size of the shared answer 232. For instance, as the size of the shared answer 232 increases relative to the local cache 226 size, the receiving module 224 is less likely to store the shared answer 232. As another example, if the sharing module 203 and/or the first peer DNS server system 204 are heavily loaded with other tasks, then caching the answer is less likely to be a priority.

Figure 5:
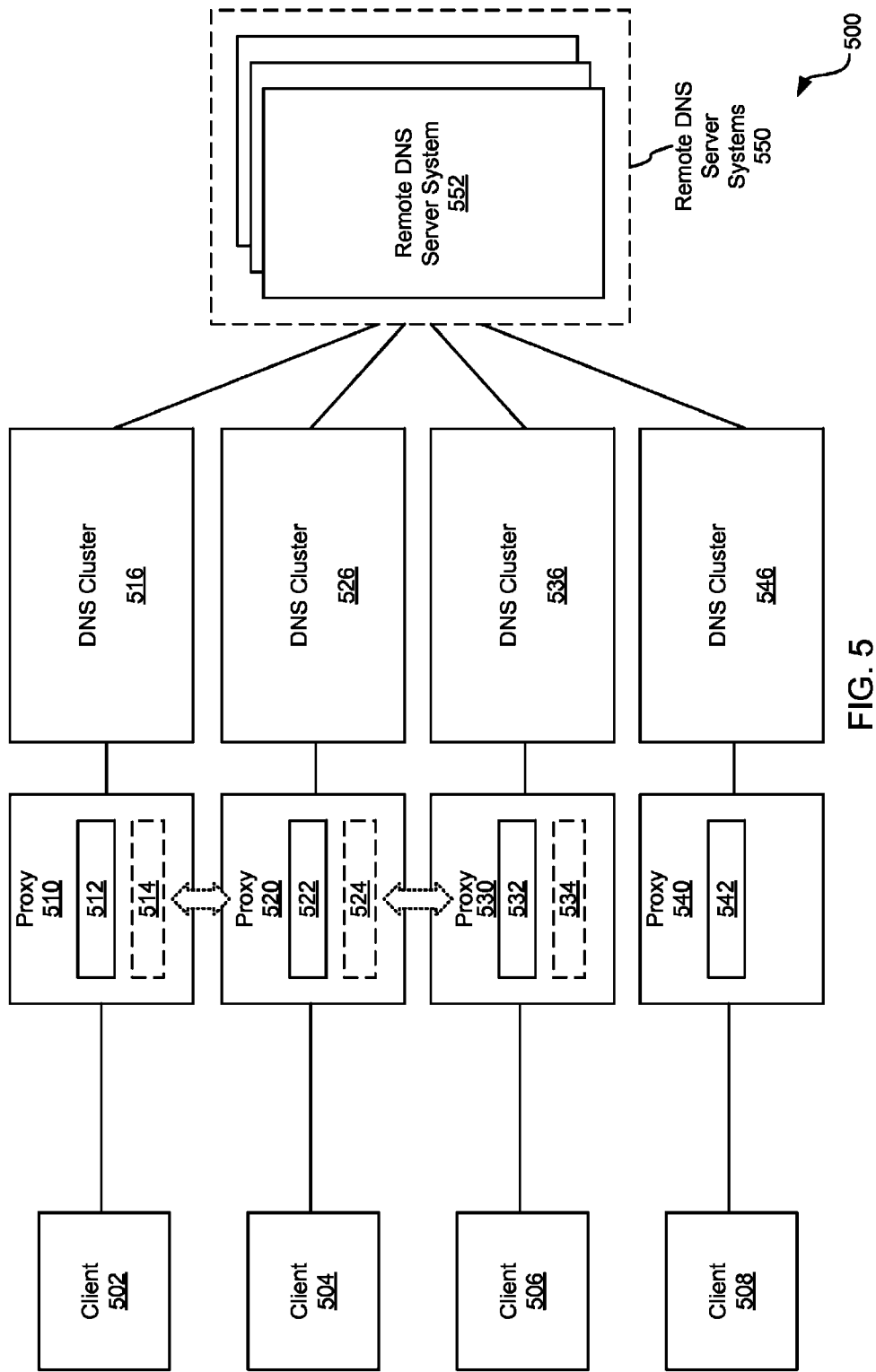
FIG. 5 illustrates an embodiment of a system for sharing DNS answers between proxies to DNS clusters.
Figure 6:
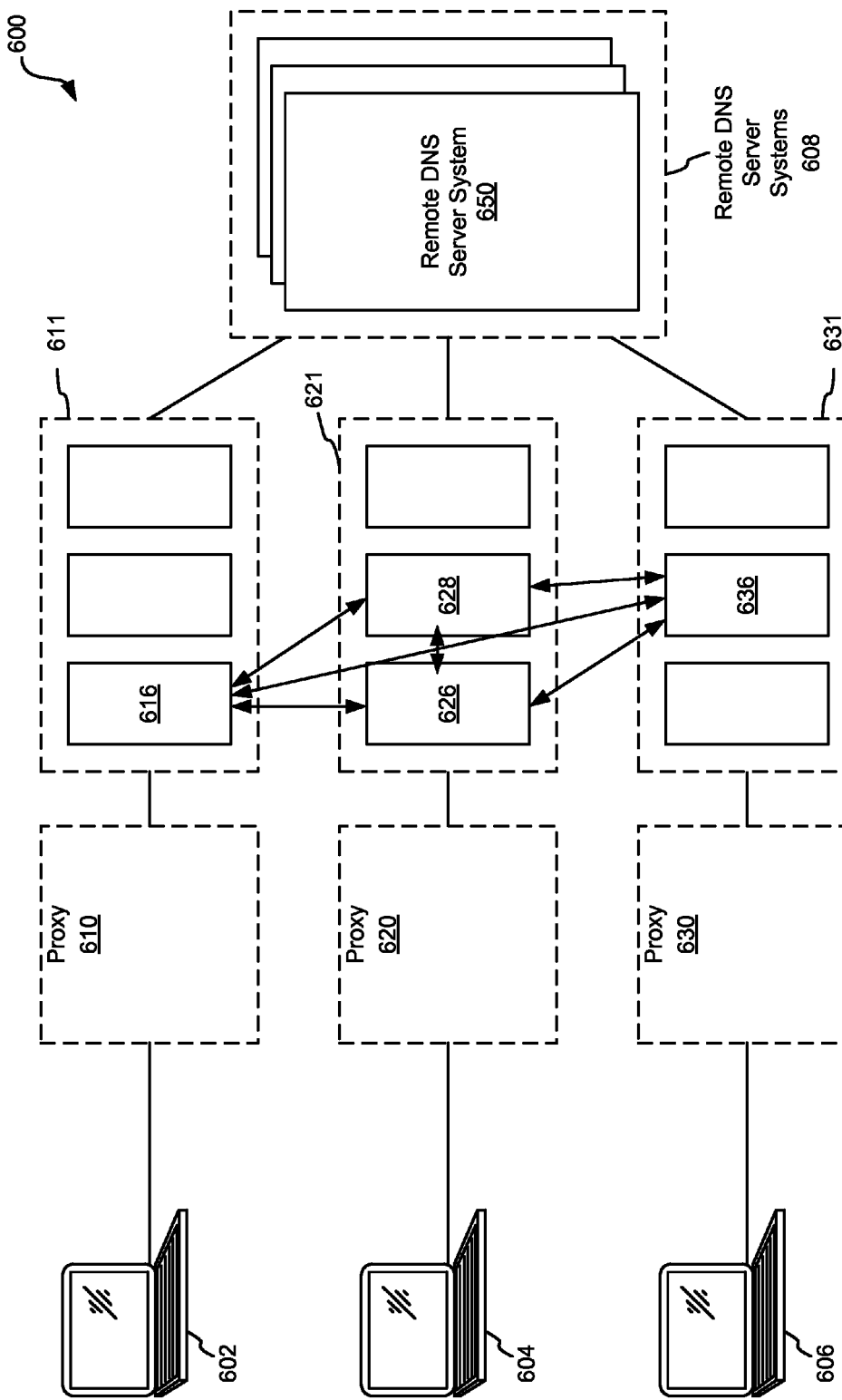
FIG. 6 illustrates an embodiment of a system for sharing DNS answers between DNS server systems in the same and different DNS clusters.

The sharing module 203 can also be implemented as a proxy, where a proxy can include any one or more of the following exemplary and non-limiting functionalities: intelligent cache, DNS proxy, firewall, filter, switch, and load balancer (e.g., see FIGS. 5-7). In one embodiment, the client or server 202 can act as a gateway for other computing systems such as the computing system of a user making a query. The sharing module 203 can be implemented in hardware, software, firmware, or a combination of these. For instance, the sharing module 203 can be implemented as a software or firmware module running on the first peer DNS server system 204. The network 210 is illustrated as two separate symbols for the sake of simplicity, but in practice is a single unified network (e.g., network 101 in FIG. 1).

Figure 3:
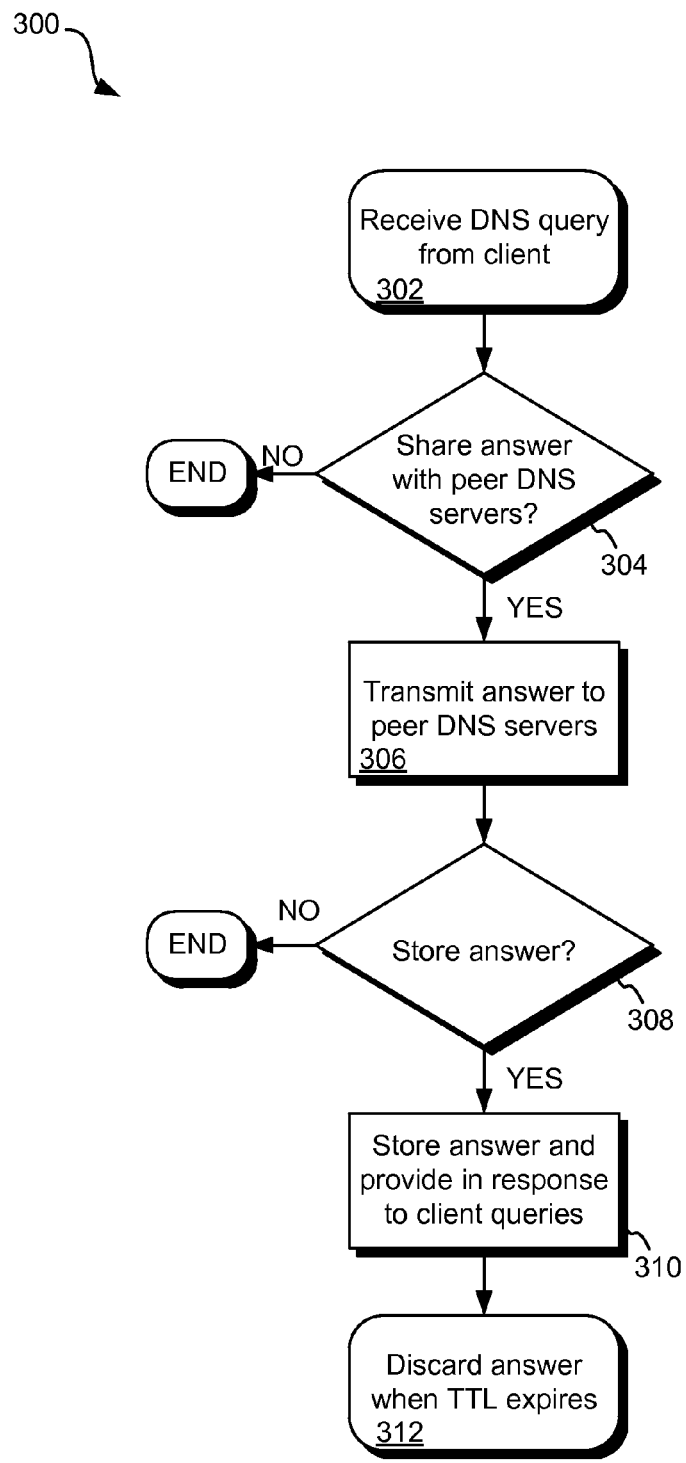
FIG. 3 illustrates a method of sharing DNS answers between peer DNS servers in a DNS cluster.

FIG. 3 illustrates a method 300 of sharing DNS answers between peer DNS servers in a DNS cluster. The method 300 includes receiving a DNS query from a client (block 302). An answer is then formulated, where the answer can include data such as an IP address for the query, or state information. The answer can either be found in a local cache (e.g., 226) or received from a remote server system in response to forwarding of the query to the remote server system. A decision 304 can determine whether the answer is to be shared with peer DNS servers in the DNS cluster. Various criteria, such as loads on the peer DNS servers or popularity of the answer, to name two examples, can be considered in the decision 404. If the answer is not to be shared, then the method 300 ends. If the answer is to be shared, then the method 300 includes transmitting some or all of the answer to one or more peer DNS servers in the DNS cluster (block 306).

The peer DNS server that receives some or all of the answer can determine if the answer should be stored (decision 308). If the answer is to be stored, then the peer DNS server can store the answer (block 310) and provide the stored answer in response to subsequent client queries. This continues until the TTL expires, at which point the peer DNS server and the originating DNS server optionally discard the answer (block 312).

As such, the sharing of answers prevents the peer DNS servers from having to perform the same query that the originating peer DNS server performed, as long as the TTL of the answer from the originating peer DNS server has yet to expire. Sharing also enhances consistency between answers that the peer DNS servers in the peer group return to clients.

The answer can be obtained via a variety of methods. In one instance, an answer may reside in a cache of the DNS server and have a non-expired TTL. In this case, the answer from the cache can be provided to the client and shared with peer DNS servers in the DNS cluster. In another instance, a peer DNS server can query a local or remote server, such as an authoritative DNS server, and receive the answer from the remote server in response.

The share answer decision 304 can take into account a variety of rules including determining whether the DNS server has sufficient resources to share some or all of the answer. In some cases, the sharing DNS server may have such a large processing load that sharing is not deemed of high enough priority to get a place in the processing stack. Other factors that may be considered are the remaining length of the TTL—if only a few seconds remains on the TTL, then there is little value in sharing an answer that will shortly expire. In an embodiment, the answer is not shared if the TTL is less than a threshold time, such as 5 seconds.

Other factors may weigh in favor of sharing an answer. For instance, an answer derived in response to a frequent query may be more likely to be shared than an answer to a less frequent query. An answer that took a long time or significant processing resources to obtain may be more likely to be shared than less-processing intensive answers.

The store answer decision 308 can also take into account a variety of rules such as whether a peer DNS server receiving a shared answer has sufficient resources to receive and store the answer Like the peer DNS server sharing an answer, the peer DNS server receiving an answer may determine that its processing load is too great to commit resources to receiving and storing the answer. The peer DNS server receiving the answer may select not to receive and/or store a shared answer because the TTL time is below a threshold.

Figure 4:
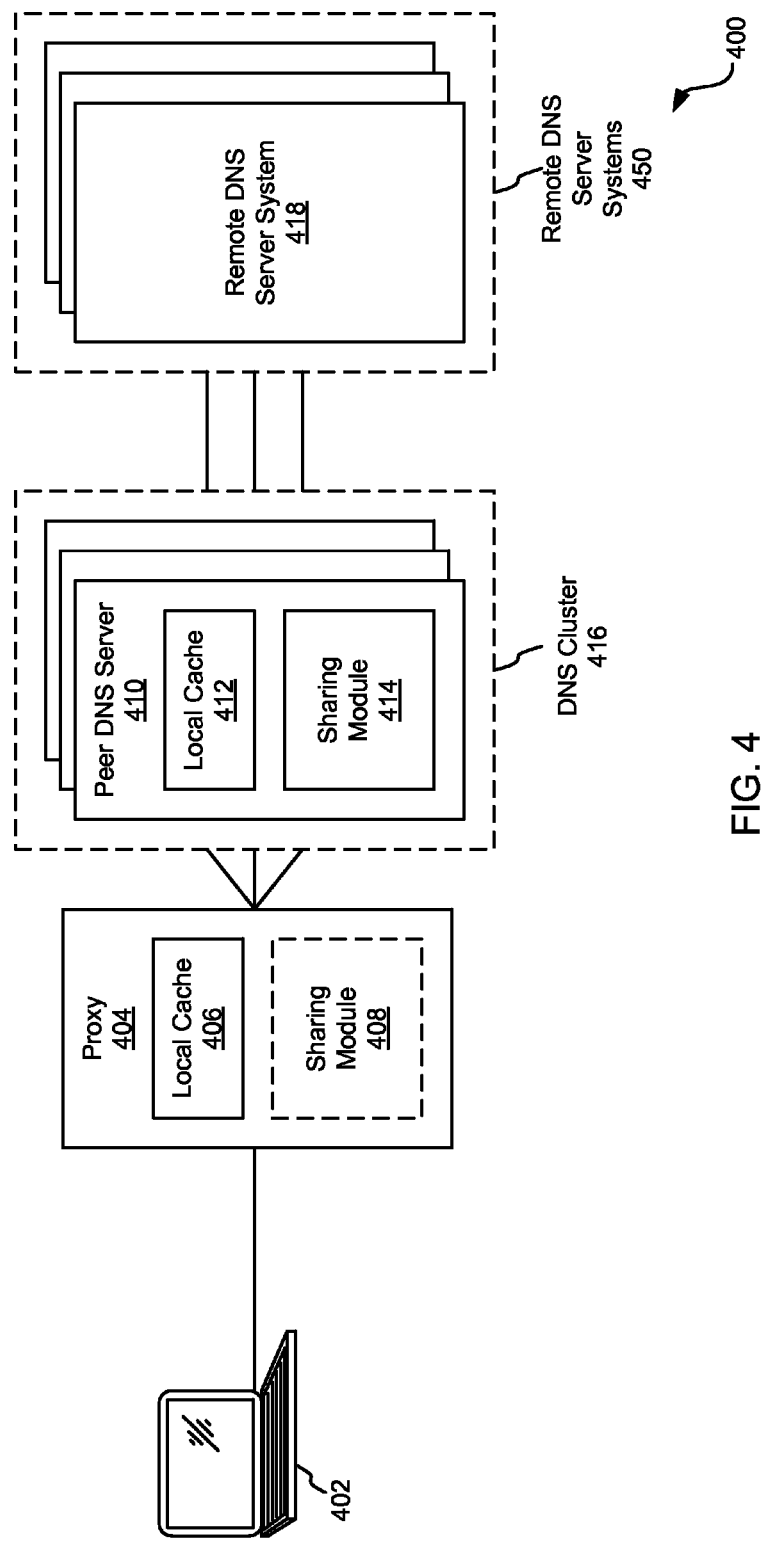
FIG. 4 illustrates yet another embodiment of a system for sharing DNS answers between peer DNS servers in a DNS cluster.

FIG. 4 illustrates yet another embodiment of a system for sharing DNS answers between peer DNS servers in a DNS cluster. A client or server 402 makes a DNS query which is received at a proxy 404 (e.g., DNS proxy, load balancer, firewall, etc.), which directs the DNS query to a peer DNS server system 410 in a DNS cluster 416. The peer DNS server system 410 checks a local cache 402 for an answer to the DNS query, and if none is found, then it forwards the DNS query to a remote server system 418 (e.g., an authoritative DNS server). Each peer DNS server in the DNS cluster may forward queries to different remote DNS server systems and even a single peer DNS server system can forward different queries to different remote DNS server systems.

The remote DNS server system 418 may return the answer to the peer DNS server system 410, which receives the answer via a sharing module 414. The sharing module 414 can determine whether the answer should be saved to a local cache 412 and also whether the answer should be shared with one or more other peer DNS servers in the DNS cluster 416. The sharing module 414 can then cache the answer in the local cache 412. The sharing module 414 can also share the answer with one or more of the other peer DNS servers in the DNS cluster 416. The other peer DNS servers may select to save the shared answer to a local cache of their own or to ignore the shared answer.

The peer DNS server system 410 also returns the answer to the client or server 402 in response to the original DNS query. The returned answer passes through and is mediated by the proxy 404. In some instances, an answer may be deemed important enough to save to a local cache 406 of the proxy 404 (e.g., the top 10 most queried answers may be stored in the local cache 406).

Other peer DNS servers in the DNS cluster 416 may also include a local cache and a sharing module. When one of these other peer DNS servers obtains an answer and determines to share the answer, it can share the answer with the peer DNS server system 410. The shared answer can be received by the sharing module 414, which determines whether or not to store the shared answer in the local cache 412. If the shared answer is stored in the local cache 412, then on subsequent DNS queries to the peer DNS server system 410, the peer DNS server 410 may be able to access an answer to such queries via the shared answer in the local cache 412 rather than having to reach out to the one or more remote DNS server systems 450 for the answer. Sharing of answers also enhances consistency of answers between peer DNS server systems in the DNS cluster 416 and decreases the power usage of obtaining answers to DNS queries.

In an optional embodiment, the proxy 404 can include an optional sharing module 408. Answers stored in the local cache 406 can be shared with other proxies (not illustrated) via the optional sharing module 408 (e.g., see FIG. 5). The proxy 404 can be embodied by any system that mediates communications between the client 402 and the DNS cluster 416. The proxy 404 can include functionality of a switch, load balancer, filter, or DNS proxy to name a few non-limiting examples. In some cases, the proxy 404 can include two or more of these functionalities. For instance, some home routers include functionality of a switch, filter, firewall, and DNS proxy. Commercial load balancing proxies, in some cases, can include switch, filter, firewall, DNS proxy, and load balancing functionality. Regardless of the combination of functionalities, proxies can typically include the optional sharing module 408.

Load balancing functionality includes the ability to direct DNS queries to different peer DNS server systems in the DNS cluster 416 based on algorithms intended to load each peer DNS server system such that DNS queries can be answered by the DNS cluster 416 in the shortest time. These algorithms can also look at logical rules dictating what types of queries are preferentially directed to certain DNS servers. For instance, a query for a particular UNIVERSITY OF MICHIGAN webpage may be best directed to a peer DNS server system that is located near the University campus and therefore handles a lot of University Internet traffic. When implemented as a DNS proxy, the proxy 404 is able to answer high volume DNS queries, thus removing load from the DNS cluster 418.

The sharing modules 414, 408 can include a query processing module, a transmission module, and a receiving module as described in FIGS. 2A and 2B.

FIG. 5 illustrates an embodiment of a system for sharing DNS answers between proxies to DNS clusters. In particular, four systems are shown, where each system shows a client 502, 504, 506, 508 making a DNS query and receiving answers. Each clients' 502, 504, 506, 508 query is handled by a proxy 510, 520, 530, 540. Each proxy 510, 520, 530, 540 forwards the query to a peer DNS server system within a DNS cluster 516, 526, 536, 546, where the particular peer DNS server systems are selected based on algorithms such as a load-balancing algorithm. As described earlier in this disclosure, each peer DNS server system can find an answer to the DNS query either in a local cache or via forwarding the query to a remote DNS server system 552. Each peer DNS server system may forward its request to the same or different remote DNS server systems within the remote DNS server systems 550. Returned answers can be stored in a local cache of a peer DNS server system and returned to the respective client 502, 504, 506, 508. Returned answers are mediated by the proxies 510, 520, 530, 540, and the proxies 510, 520, 530, 540 can store one or more answers in a local cache 512, 522, 532, 542.

Proxies 510, 520, 530, 540 can share answers. For instance, proxy 510 shares at least one answer with proxy 520. Proxy 520 shares at least one answer with proxy 530. However, not all proxies share or are able to share answers. In particular, only proxies having an optional sharing module 514, 524, 534 can share answers, and both proxies engaging in sharing an answer should have a sharing module 514, 524, 534. So, for instance, since proxy 540 does not have a sharing module, the other proxies 510, 520, 530 cannot share answers with the proxy 540, and vice versa.

Even if an answer is shared from one proxy to another, the receiving proxy still determines whether to store the shared answer in its local cache. This determination may look at the same factors that the proxy looks at when determining which answers to cache as they come from a DNS cluster. For instance, only a shared answer deemed to be an answer to a high volume DNS query may be stored. Geography or some other logical relation may determine which proxies share answers with each other. For instance, proxies in New England may share answers.

As seen, a client may make a DNS request that is directed to a peer DNS server system in a first DNS cluster and receive an answer from that peer DNS server, yet the answer may have originally been obtained via a peer DNS server in another DNS cluster.

FIG. 6 illustrates an embodiment of a system for sharing DNS answers between DNS server systems in the same and different DNS clusters. The system 600 includes multiple clients 602, 604, 606 each making one or more DNS requests.

The DNS requests are handled by separate DNS clusters 611, 621, 631, and queries to the DNS clusters 611, 621, 631 and answers returned to the clients 602, 604, 606 can be mediated by a respective proxy 610, 620, 630. Answers to the DNS queries can be obtained, for instance, from a remote DNS server system 650, one of many remote DNS server systems 608, or from a local cache on the DNS server system handling the DNS query. The answers can then be returned to the clients 602, 604, 606, and this return of answers can be mediated by the optional proxies 610, 620, 630.

A DNS server system can share answers with other DNS server systems within a DNS cluster, such as DNS server systems 626 and 628 within the DNS cluster 621. DNS server systems can also share answers with DNS server systems in other DNS clusters. For example, DNS server systems 616, 626, 628, 636 can share answers despite residing in different DNS clusters 611, 621, 631. DNS server systems that share answers may be those that are geographical related or have some other logical relation. For instance, all servers in a geographic region that primarily respond to enterprise requests may share answers. In an alternative example, all DNS server systems that serve financial institutions, regardless of geography, may share answers. In yet a further example, all DNS server systems operated by, or on behalf of, STARBUCKS may share answers.

Throughout this disclosure a single proxy has been illustrated for mediating communication between a client and a single DNS cluster. However, in practice, multiple proxies can mediate communications between a client and a single DNS cluster. In such situations, each proxy can have a local cache and each proxy can include a sharing module.

The systems and methods described herein can be implemented in a machine such as a computer system in addition to the specific physical devices described herein. FIG. 7 shows a diagrammatic representation of one embodiment of a machine in the exemplary form of a computer system 700 within which a set of instructions can execute for causing a device to perform or execute any one or more of the aspects and/or methodologies of the present disclosure. The components in FIG. 7 are examples only and do not limit the scope of use or functionality of any hardware, software, embedded logic component, or a combination of two or more such components implementing particular embodiments.

Computer system 700 may include a processor 701, a memory 703, and a storage 708 that communicate with each other, and with other components, via a bus 740. The bus 740 may also link a display 732, one or more input devices 733 (which may, for example, include a keypad, a keyboard, a mouse, a stylus, etc.), one or more output devices 734, one or more storage devices 735, and various tangible storage media 736. All of these elements may interface directly or via one or more interfaces or adaptors to the bus 740. For instance, the various tangible storage media 736 can interface with the bus 740 via storage medium interface 726. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 701 (or central processing unit(s) (CPU(s))) optionally contains a cache memory unit 702 for temporary local storage of instructions, data, or computer addresses. Processor(s) 701 are configured to assist in execution of computer readable instructions. Computer system 700 may provide functionality as a result of the processor(s) 701 executing software embodied in one or more tangible computer-readable storage media, such as memory 703, storage 708, storage devices 735, and/or storage medium 736. The computer-readable media may store software that implements particular embodiments, and processor(s) 701 may execute the software. Memory 703 may read the software from one or more other computer-readable media (such as mass storage device(s) 735, 736) or from one or more other sources through a suitable interface, such as network interface 720. The software may cause processor(s) 701 to carry out one or more processes or one or more steps of one or more processes described or illustrated herein. Carrying out such processes or steps may include defining data structures stored in memory 703 and modifying the data structures as directed by the software.

The memory 703 may include various components (e.g., machine readable media) including, but not limited to, a random access memory component (e.g., RAM 704) (e.g., a static RAM "SRAM", a dynamic RAM "DRAM, etc.), a read-only component (e.g., ROM 705), and any combinations thereof. ROM 705 may act to communicate data and instructions unidirectionally to processor(s) 701, and RAM 704 may act to communicate data and instructions bidirectionally with processor(s) 701. ROM 705 and RAM 704 may include any suitable tangible computer-readable media described below. In one example, a basic input/output system 706 (BIOS), including basic routines that help to transfer information between elements within computer system 700, such as during start-up, may be stored in the memory 703.

Fixed storage 708 is connected bidirectionally to processor(s) 701, optionally through storage control unit 707. Fixed storage 708 provides additional data storage capacity and may also include any suitable tangible computer-readable media described herein. Storage 708 may be used to store operating system 709, EXECs 710 (executables), data 711, APV applications 712 (application programs), and the like. Often, although not always, storage 708 is a secondary storage medium (such as a hard disk) that is slower than primary storage (e.g., memory 703). Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with computer system 700 (e.g., via an external port connector (not shown)) via a storage device interface 725. Particularly, storage device(s) 735 and an associated machine-readable medium may provide nonvolatile and/or volatile storage of machine-readable instructions, data structures, program modules, and/or other data for the computer system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 700 may also include an input device 733. In one example, a user of computer system 700 may enter commands and/or other information into computer system 700 via input device(s) 733. Examples of an input device(s) 733 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when computer system 700 is connected to network 730, computer system 700 may communicate with other devices, specifically mobile devices and enterprise systems, connected to network 730. Communications to and from computer system 700 may be sent through network interface 720. For example, network interface 720 may receive incoming communications (such as queries or responses from other devices) in the form of one or more packets (such as Internet Protocol (IP) packets) from network 730, and computer system 700 may store the incoming communications in memory 703 for processing. Computer system 700 may similarly store outgoing communications (such as queries or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 or network segment 730 include, but are not limited to, a wide area network (WAN) (e.g., the Internet, a network including the Internet, an enterprise network), a local area network (LAN) (e.g., a network associated with an office, a building, a campus or other relatively small geographic space), a telephone network, a direct connection between two computing devices, and any combinations thereof. A network, such as network 730, may employ a wired and/or a wireless mode of communication. In general, any network topology may be used.

Information and data can be displayed through a display 732. Examples of a display 732 include, but are not limited to, a liquid crystal display (LCD), an organic liquid crystal display (OLED), a cathode ray tube (CRT), a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721.

In addition to a display 732, computer system 700 may include one or more other peripheral output devices 734 including, but not limited to, an audio speaker, a printer, and any combinations thereof. Such peripheral output devices may be connected to the bus 740 via an output interface 724. Examples of an output interface 724 include, but are not limited to, a serial port, a parallel connection, a USB port, a FIREWIRE port, a THUNDERBOLT port, and any combinations thereof.

In addition or as an alternative, computer system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for responding to a client DNS query comprising:
   receiving a DNS query from a client at a first DNS server system;
   obtaining a DNS answer to the DNS query;
   storing the DNS answer in a first local cache of the first DNS server system;
   selecting a subset of DNS answers on the first local cache to be shared with a second DNS server system, wherein the subset includes at least the DNS answer to the DNS query, wherein the selecting is based on one or more of the following: a TTL value of the DNS answer, a popularity of the DNS query, an amount of time or processing resources used to process the DNS query;
   sharing the subset of DNS answers with the second DNS server system;
   storing the subset of DNS answers on a second local cache of the second DNS server system; and
   returning the DNS answer to the client.

2. The method of claim 1, wherein the DNS answer includes an IP address.

3. The method of claim 1, wherein the DNS answer includes state information.

4. The method of claim 1, wherein the obtaining includes:
   passing the DNS query to at least one remote DNS server system; and
   receiving the DNS answer to the DNS query from the at least one remote DNS server system.

5. The method of claim 1, wherein the first and second DNS server systems are part of a DNS cluster.

6. The method of claim 1, wherein the first DNS server system is part of a first DNS cluster and the second DNS server system is part of a second DNS cluster.

7. The method of claim 6, wherein the first and second DNS server systems are geographically or logically related.

8. A DNS server cluster comprising:
   a first peer DNS server system having a first local cache;
   a second peer DNS server system that:
      receives a DNS query from a client;
      checks a second local cache of the second peer DNS server system for a DNS answer to the DNS query; and not finding the DNS answer,
      passes the DNS query to at least one remote DNS server system;
      receives the DNS answer from the remote DNS server system;
      passes the DNS answer to the client in response to the DNS query;
      stores the DNS answer in the second local cache of the second peer DNS server system;
      selects a subset of DNS answers in the second local cache of the second peer DNS server system to be shared with the first peer DNS server system, wherein the subset includes at least the DNS answer, and wherein the selecting is based on one or more of the following: a TTL value of the DNS answer, a popularity of the DNS query, an amount of time or processing resources used to process the DNS query; and
      shares the subset of DNS answers with the first peer DNS server system, wherein the subset is stored on the first local cache of the first peer DNS server system.

9. The DNS server cluster of claim 8, wherein the second peer DNS server system comprises:
   a query processing module that:
      receives the DNS query from the client;
      passes the DNS query to the remote DNS server system;
      receives the DNS answer from the remote DNS server system;
      passes the DNS answer to the client in response to the DNS query; and
   a transmission module that shares the subset of DNS answers with the first peer DNS server system.

10. The DNS server cluster of claim 8, wherein the first peer DNS server system includes a receiving module that receives the subset of DNS answers shared by the second peer DNS server system and stores the subset of DNS answers on the first local cache of the first peer DNS server system.

11. A sharing module of a first DNS server system comprising:
   a query processing module that:
      receives a first DNS query for a first DNS answer from a first client;
      passes the first DNS query to a remote DNS server system;
      receives the first DNS answer from the remote DNS server system;
      returns the first DNS answer to the first client in response to the first DNS query;
      stores the first DNS answer in a first local cache of the first DNS server system; and
   a transmission module that shares the first DNS answer with at least a second DNS server system as long as the first DNS answer matches one or more of the following: a TTL value of the DNS answer, a popularity of the DNS query, an amount of time or processing resources used to process the DNS query; and
   a receiving module that:
      receives a second DNS answer from a third DNS server system; and
      stores the second DNS answer in the first local cache of the first DNS server system.

12. The sharing module of claim 11, wherein the query processing module:
   receives a second DNS query for the second DNS answer from a second client;
   checks the first local cache for the second DNS answer; and finding the second DNS answer in the first local cache,
   returns the second DNS answer to the second client in response to the second DNS query.

13. The sharing module of claim 11, wherein the sharing module further includes a receiving module that:
   receives a second DNS answer from the second DNS server system; and
   stores the second DNS answer in the first local cache of the first DNS server system.

14. The sharing module of claim 11, wherein the second DNS server system is a peer DNS server system.

15. The sharing module of claim 11, wherein the second DNS server system is logically related to the first DNS server system.

16. The sharing module of claim 15, wherein the second DNS server system is geographically related to the first DNS server system.

17. A sharing module of a first proxy server comprising:
a query processing module that:
- receives a first DNS query for a first DNS answer from a first client;
- directs the first DNS query to a first of a plurality of DNS server systems in a DNS cluster;
- receives the first DNS answer from the first of the plurality of DNS server systems;
- stores the first DNS answer in a first local cache of the first proxy server;
- selects a subset of DNS answers on the first local cache to be shared with a second proxy server, wherein the subset includes at least the first DNS answer, wherein the selecting is based on one or more of the following: a TTL value of the DNS answer, a popularity of the DNS query, an amount of time or processing resources used to process the DNS query; and
- returns the first DNS answer to the first client in response to the first DNS query; and a transmission module that shares the subset of DNS answers with at least the second proxy server.

18. The sharing module of claim 17, wherein the proxy server caches two or more of the most commonly-requested DNS answers.

19. The sharing module of claim 17, wherein the proxy server distributes DNS queries to the DNS cluster based on load balancing considerations.

20. The sharing module of claim 17, wherein the proxy server filters DNS queries to the DNS cluster.

21. The sharing module of claim 17, wherein the sharing module further includes a receiving module that:
- receives a second DNS answer from a third proxy server system; and
- stores the second DNS answer in the first local cache of the first proxy server.

22. The sharing module of claim 21, wherein the query processing module:
- receives a second DNS query for the second DNS answer from a second client;
- checks the first local cache for the second DNS answer; and finding the second DNS answer in the first local cache,
- returns the second DNS answer to the second client in response to the second DNS query.

23. The sharing module of claim 17, wherein the sharing module further includes a receiving module that:
- receives a second DNS answer from the second proxy server; and
- stores the second DNS answer in the first local cache of the first proxy server.

24. The sharing module of claim 17, wherein the second proxy server is logically related to the first proxy server.

25. The sharing module of claim 24, wherein the second proxy server is geographically related to the first proxy server.

* * * * *